United States Patent
Moulton et al.

(10) Patent No.: US 7,509,420 B2
(45) Date of Patent: Mar. 24, 2009

(54) SYSTEM AND METHOD FOR INTELLIGENT, GLOBALLY DISTRIBUTED NETWORK STORAGE

(75) Inventors: Gregory Hagan Moulton, Irvine, CA (US); Stephen B. Whitehill, Tustin, CA (US)

(73) Assignee: EMC Corporation, Hopkinton, MA (US)

( * ) Notice: Subject to any disclaimer, the term of this patent is extended or adjusted under 35 U.S.C. 154(b) by 1280 days.

(21) Appl. No.: 09/777,002

(22) Filed: Feb. 5, 2001

(65) Prior Publication Data

US 2001/0034795 A1  Oct. 25, 2001

(51) Int. Cl.
| | |
|---|---|
| G06F 15/16 | (2006.01) |
| G06F 15/167 | (2006.01) |
| G06F 15/173 | (2006.01) |
| G06F 12/00 | (2006.01) |
| G06F 13/00 | (2006.01) |
| G06F 13/28 | (2006.01) |

(52) U.S. Cl. .................. 709/226; 709/203; 709/211; 709/213; 709/214; 709/215; 709/216

(58) Field of Classification Search .............. 709/201, 709/204, 205, 213, 214, 215
See application file for complete search history.

(56) References Cited

U.S. PATENT DOCUMENTS

| | | | |
|---|---|---|---|
| 3,668,647 A | 6/1972 | Evangelisti et al. ...... 340/172.5 |
| 4,215,402 A | 7/1980 | Mitchell et al. ............ 364/200 |
| 4,404,676 A | 9/1983 | DeBenedictis | |
| 4,649,479 A | 3/1987 | Advani et al. ............... 364/300 |
| 4,694,396 A | 9/1987 | Weisshaar et al. | |
| 4,761,785 A | 8/1988 | Clark et al. ................... 371/51 |
| 4,814,984 A | 3/1989 | Thompson | |
| 4,887,204 A | 12/1989 | Johnson et al. ............. 364/200 |
| 4,887,235 A | 12/1989 | Holloway et al. .......... 364/900 |
| 4,897,781 A | 1/1990 | Chang et al. ................ 364/200 |
| 4,901,223 A | 2/1990 | Rhyne ......................... 364/200 |
| 4,929,946 A | 5/1990 | O'Brien et al. | |
| 4,982,324 A | 1/1991 | McConaughy et al. ...... 364/200 |
| 5,005,122 A | 4/1991 | Griffin et al. ................ 364/200 |
| 5,016,009 A | 5/1991 | Whiting et al. | |
| 5,018,060 A | 5/1991 | Gelb et al. ................... 364/200 |
| 5,089,958 A | 2/1992 | Horton et al. ............... 395/575 |

(Continued)

FOREIGN PATENT DOCUMENTS

EP  0670543  9/1995

(Continued)

OTHER PUBLICATIONS

Tridgell, Andrew, Efficient Algorithms for Sorting and Synchronization, Apr. 2000, pp. i-viii, pp. 1-106.

(Continued)

*Primary Examiner*—Hassan Phillips
(74) *Attorney, Agent, or Firm*—Workman Nydegger

(57) ABSTRACT

A data storage system comprising a plurality of storage nodes, each node existing at a physical location having one or more contexts. Interface mechanisms couple to each storage node to communicate storage access requests with the storage node. Data storage management processes select one or more of the storage nodes to serve a data storage request based at least in part upon the particular contexts of each of the storage nodes.

25 Claims, 5 Drawing Sheets

U.S. PATENT DOCUMENTS

| | | | |
|---|---|---|---|
| 5,109,515 A | 4/1992 | Laggis et al. ............... 395/725 |
| 5,126,739 A | 6/1992 | Whiting et al. |
| 5,130,992 A | 7/1992 | Frey, Jr. et al. |
| 5,133,065 A | 7/1992 | Cheffetz et al. ............. 395/575 |
| 5,140,321 A | 8/1992 | Jung |
| 5,146,568 A | 9/1992 | Flaherty et al. ............. 395/325 |
| 5,153,986 A | 10/1992 | Brauer et al. |
| 5,155,835 A | 10/1992 | Belsan ........................ 395/425 |
| 5,162,986 A | 11/1992 | Graber et al. ............... 364/146 |
| 5,163,148 A | 11/1992 | Walls .......................... 395/600 |
| 5,202,982 A | 4/1993 | Gramlich et al. |
| 5,210,866 A | 5/1993 | Milligan et al. .............. 395/575 |
| 5,218,695 A | 6/1993 | Noveck et al. .............. 395/600 |
| 5,239,637 A | 8/1993 | Davis et al. ................. 395/425 |
| 5,239,647 A | 8/1993 | Anglin et al. ................ 395/600 |
| 5,239,659 A | 8/1993 | Rudeseal et al. ............ 395/800 |
| 5,263,154 A | 11/1993 | Eastridge et al. ............ 395/575 |
| 5,276,860 A | 1/1994 | Fortier et al. ................ 395/575 |
| 5,276,867 A | 1/1994 | Kenley et al. ............... 395/600 |
| 5,278,838 A | 1/1994 | Ng et al. ..................... 371/10.1 |
| 5,281,967 A | 1/1994 | Jung |
| 5,305,389 A | 4/1994 | Palmer ........................ 382/1 |
| 5,317,728 A | 5/1994 | Tevis et al. .................. 395/600 |
| 5,325,505 A | 6/1994 | Hoffecker et al. ........... 395/425 |
| 5,347,653 A | 9/1994 | Flynn et al. ................. 395/600 |
| 5,355,453 A | 10/1994 | Row et al. ................... 395/200 |
| 5,367,637 A | 11/1994 | Wei ............................ 395/250 |
| 5,367,698 A | 11/1994 | Webber et al. .............. 395/800 |
| 5,379,418 A | 1/1995 | Shimazaki et al. .......... 395/575 |
| 5,394,555 A | 2/1995 | Hunter et al. |
| 5,403,639 A | 4/1995 | Belsan et al. ................ 395/600 |
| 5,404,508 A | 4/1995 | Konrad et al. ............... 395/600 |
| 5,404,527 A | 4/1995 | Irwin et al. .................. 395/700 |
| 5,406,279 A | 4/1995 | Anderson et al. |
| 5,448,718 A | 9/1995 | Cohn et al. .................. 395/404 |
| 5,452,440 A | 9/1995 | Salsburg ...................... 395/463 |
| 5,452,454 A | 9/1995 | Basu ........................... 395/700 |
| 5,454,099 A | 9/1995 | Myers et al. ................. 395/575 |
| 5,479,654 A | 12/1995 | Squibb ........................ 395/600 |
| 5,485,474 A | 1/1996 | Rabin |
| 5,487,160 A | 1/1996 | Bemis ........................ 395/441 |
| 5,488,731 A | 1/1996 | Mendelsohn |
| 5,497,483 A | 3/1996 | Beardsley et al. ........... 395/575 |
| 5,513,314 A | 4/1996 | Kandasamy et al. ... 395/182.04 |
| 5,515,502 A | 5/1996 | Wood .................... 395/182.13 |
| 5,521,597 A | 5/1996 | Dimitri |
| 5,524,205 A | 6/1996 | Lomet et al. ........... 395/182.14 |
| 5,532,694 A | 7/1996 | Mayers et al. |
| 5,535,407 A | 7/1996 | Yanagawa et al. ........... 395/800 |
| 5,544,320 A | 8/1996 | Konrad .................. 395/200.09 |
| 5,559,991 A | 9/1996 | Kanfi .......................... 395/489 |
| 5,574,906 A | 11/1996 | Morris ........................ 395/601 |
| 5,586,322 A | 12/1996 | Beck et al. .................. 395/616 |
| 5,604,862 A | 2/1997 | Midgely et al. ......... 395/182.04 |
| 5,606,719 A | 2/1997 | Nichols et al. .............. 395/876 |
| 5,608,801 A | 3/1997 | Aiello et al. |
| 5,640,561 A | 6/1997 | Satoh et al. ................. 395/618 |
| 5,649,196 A | 7/1997 | Woodhill et al. ............ 395/620 |
| 5,659,743 A | 8/1997 | Adams et al. ............... 395/621 |
| 5,659,747 A | 8/1997 | Nakajima .................... 395/651 |
| 5,689,678 A | 11/1997 | Stallmo et al. |
| 5,696,901 A | 12/1997 | Konrad .................. 395/200.09 |
| 5,742,811 A | 4/1998 | Agrawal et al. |
| 5,751,936 A | 5/1998 | Larson et al. .......... 395/182.05 |
| 5,754,844 A | 5/1998 | Fuller ......................... 395/606 |
| 5,765,173 A | 6/1998 | Cane et al. .................. 707/204 |
| 5,771,354 A | 6/1998 | Crawford ............... 395/200.59 |
| 5,778,395 A | 7/1998 | Whiting et al. ............. 707/204 |
| 5,793,869 A | 8/1998 | Claflin, Jr. |
| 5,794,254 A * | 8/1998 | McClain .................... 707/204 |
| 5,802,264 A | 9/1998 | Chen et al. ............. 395/182.04 |
| 5,802,297 A | 9/1998 | Engquist ................ 395/200.42 |
| 5,805,804 A | 9/1998 | Laursen et al. |
| 5,826,001 A | 10/1998 | Lubbers et al. |
| 5,831,558 A | 11/1998 | Harvell |
| 5,832,222 A | 11/1998 | Dziadosz |
| 5,842,224 A | 11/1998 | Fenner |
| 5,850,565 A | 12/1998 | Wightman |
| 5,870,474 A | 2/1999 | Wasilewski et al. |
| 5,908,540 A | 6/1999 | Cartar et al. |
| 5,909,677 A | 6/1999 | Broder et al. |
| 5,915,024 A | 6/1999 | Kitaori et al. |
| 5,931,947 A * | 8/1999 | Burns et al. ..................... 726/4 |
| 5,933,104 A | 8/1999 | Kimura |
| 5,933,592 A | 8/1999 | Lubbers et al. |
| 5,943,443 A | 8/1999 | Itonori et al. |
| 5,974,506 A | 10/1999 | Sicola et al. |
| 5,978,791 A | 11/1999 | Farber et al. .................... 707/2 |
| 5,987,506 A * | 11/1999 | Carter et al. ................. 709/213 |
| 5,990,810 A | 11/1999 | Williams |
| 5,996,089 A | 11/1999 | Mann et al. |
| 6,000,020 A | 12/1999 | Chin et al. |
| 6,014,676 A | 1/2000 | McClain .................... 707/204 |
| 6,016,553 A | 1/2000 | Schneider et al. ............. 714/21 |
| 6,021,409 A | 2/2000 | Burrows |
| 6,021,491 A | 2/2000 | Renaud et al. |
| 6,029,168 A | 2/2000 | Frey ............................ 707/10 |
| 6,044,220 A | 3/2000 | Breternitz, Jr. |
| 6,065,008 A | 5/2000 | Simon et al. |
| 6,085,030 A | 7/2000 | Whitehead et al. ...... 395/200.33 |
| 6,085,298 A | 7/2000 | Ohran ........................ 711/162 |
| 6,122,754 A | 9/2000 | Litwin et al. ................... 714/4 |
| 6,128,762 A | 10/2000 | Jadav et al. |
| 6,141,421 A | 10/2000 | Takaragi et al. |
| 6,148,377 A | 11/2000 | Carter et al. ................. 711/147 |
| 6,148,414 A | 11/2000 | Brown et al. |
| 6,151,659 A | 11/2000 | Solomon et al. |
| 6,170,744 B1 | 1/2001 | Lee et al. |
| 6,199,099 B1 | 3/2001 | Gershman et al. |
| 6,199,179 B1 | 3/2001 | Kauffman et al. |
| 6,219,423 B1 | 4/2001 | Davis |
| 6,230,155 B1 | 5/2001 | Broder et al. |
| 6,268,809 B1 | 7/2001 | Saito |
| 6,307,487 B1 | 10/2001 | Luby |
| 6,320,520 B1 | 11/2001 | Luby |
| 6,351,838 B1 | 2/2002 | Amelia |
| 6,356,979 B1 | 3/2002 | Sicola et al. |
| 6,374,250 B2 | 4/2002 | Ajtai et al. |
| 6,377,907 B1 | 4/2002 | Waclawski |
| 6,389,432 B1 * | 5/2002 | Pothapragada et al. ...... 707/205 |
| 6,393,473 B1 | 5/2002 | Chu |
| 6,463,454 B1 | 10/2002 | Lumelsky et al. |
| 6,535,894 B1 | 3/2003 | Schmidt et al. |
| 6,549,943 B1 | 4/2003 | Spring |
| 6,553,494 B1 | 4/2003 | Glass |
| 6,571,354 B1 | 5/2003 | Parks et al. |
| 6,611,213 B1 | 8/2003 | Bentley et al. |
| 6,643,795 B1 | 11/2003 | Sicola et al. |
| 6,654,831 B1 | 11/2003 | Otterness et al. |
| 6,667,700 B1 | 12/2003 | McCanne et al. |
| 6,671,358 B1 | 12/2003 | Seidman et al. |
| 6,704,730 B2 | 3/2004 | Moulton et al. |
| 6,754,181 B1 | 6/2004 | Elliott et al. |
| 6,760,330 B2 | 7/2004 | Tahan |
| 6,779,030 B1 | 8/2004 | Dugan et al. |
| 6,802,068 B1 | 10/2004 | Guruprasad |
| 6,810,398 B2 | 10/2004 | Moulton |
| 6,826,690 B1 | 11/2004 | Hind et al. |
| 6,826,711 B2 | 11/2004 | Moulton et al. |
| 6,828,925 B2 | 12/2004 | McCanne et al. |
| 6,839,827 B1 | 1/2005 | Beardsley et al. |
| 6,961,009 B2 | 11/2005 | McCanne et al. |
| 6,970,434 B1 | 11/2005 | Mahany et al. |
| 7,000,143 B2 | 2/2006 | Moulton et al. |

| | | | |
|---|---|---|---|
| 7,062,648 | B2 | 6/2006 | Moulton et al. |
| 7,116,249 | B2 | 10/2006 | McCanne et al. |
| 7,194,504 | B2 | 3/2007 | Moulton |
| 7,272,602 | B2 | 9/2007 | Moulton |
| 2001/0052024 | A1 | 12/2001 | Devarakonda et al. |
| 2002/0029319 | A1 | 3/2002 | Robbins et al. |
| 2002/0035667 | A1 | 3/2002 | Bruning, III et al. |
| 2002/0059539 | A1 | 5/2002 | Anderson et al. |
| 2002/0194209 | A1 | 12/2002 | Bolosky et al. |
| 2002/0194484 | A1 | 12/2002 | Bolosky et al. |
| 2003/0033247 | A1* | 2/2003 | McCrossin et al. ............ 705/40 |
| 2004/0148306 | A1 | 7/2004 | Moulton et al. |
| 2004/0162808 | A1 | 8/2004 | Margolus et al. |
| 2005/0091234 | A1 | 4/2005 | Hsu et al. |
| 2005/0120137 | A1 | 6/2005 | Moulton |

FOREIGN PATENT DOCUMENTS

| | | |
|---|---|---|
| EP | 0947932 | 10/1999 |
| JP | 4062-2813 A | 7/1994 |
| WO | WO97/50205 | 12/1997 |
| WO | WO99/09480 | 2/1999 |
| WO | WO99/38093 | 7/1999 |

OTHER PUBLICATIONS

Generic Diff Format Specification, Submitted to W3C Aug. 21, 1997 http://www.w3.org/TR/NOTE-gdiff-19970901.

Abd El Fattah, Ahmed Hegazy, "Searching Large Textual Files for Near Matching Patterns", Dissertation, School of Engineering and Applied Science, George Washington University, Jul. 24, 1985.

Aho et al. "Data Structures and Algorithms", 1983, Chapter 4, Addison-Wesley Publishing Company, Reading, MA, pp. 107-151.

Bajaj et al., "Progressive Image Transmission: An Adaptive Quadtree-Pruning Approach"; Department of Computer Sciences, Purdue University, West Lafayette, IN, 1997 IEEE.

Broder, A.Z., "On the Resemblance and Containment of Documents", Digital Systems Research Center, Palo Alto, CA.

Kabbaj, Adil, "Conceptual Lexicon"http://amine-platform.sourceforge.net/component/kernel/lexicons.htm, Nov. 29, 2004.

Karp, R.M. et al., "Efficient Randomized Pattern-Matching Algorithms" IBM Journal of Research and Development, vol. 31 No. 2, Mar. 1987, pp. 249-260.

Kornblum, J. "Identifying Almost Identical Files Using Context Triggered Piecewise Hashing", Digital Investigation, vol. 35 pp. S91-S97, 2006.

Memon, N.D. et al, "Asymmetric lossless image compression"; 1995 IEEE, pp. 457.

Mogul, Jeffrey C. et al., "Potential benefits of delta encoding and data compression for HTTP", Digital Equipment Corporation Western Research Laboratory, Palo Alto, CA.

Rabin, M.O., "Fingerprinting by Random Polynomials", TR-15-81, Department of Computer Science, Harvard University, 1981.

Raj, B., Whittaker, E.W.D., "Lossless compression of language model structure and word identifiers"2003. Proceedings. (ICASSP '03). 2003 IEEE pp. I-388-I-391.

Renu Tewari Daniel M. Dian Rajat Mukherjee Harrick M Vin, "High Availability in Clustered Multimedia Servers". Proceedings of the 12th International Conference on Data Engineering, 1996.

Scheirer, W. et al. "Comparison of Three Sliding-Window Based Worm Signature Generation Schemes", CSE Dept, Lehigh University.

Schleimer, S. et al. "Winnowing: Local Algorithms for Document Fingerprinting", SIGMOD 2003, Jun. 9-12, 2003, San Diego, CA.

Spring, N.T. et al., "A Protocol-Independent Technique for Eliminating Redundant Network Traffic", Computer Science and Engineering, 352350, University of Washing, Seattle, WA.

Tridgell, A. SpamSum Overview and code samba.org/ftp/unpacked/junkcode/spamsum, 2002.

U.S. Appl. No. 10/998,458, filed May 7, 2007, Office Action.

U.S. Appl. No. 10/998,458, filed Nov. 23, 2007, Office Action.

U.S. Appl. No. 10/998,458, filed Jun. 20, 2008, Office Action.

* cited by examiner

SYSTEM AND METHOD FOR INTELLIGENT, GLOBALLY DISTRIBUTED NETWORK STORAGE

BACKGROUND OF THE INVENTION

1. Field of the Invention

The present invention relates, in general, to network data storage, and, more particularly, to software, systems and methods for intelligent management of globally distributed network storage.

2. Relevant Background

Economic, political, and social power are increasingly managed by data. Transactions and wealth are represented by data. Political power is analyzed and modified based on data. Human interactions and relationships are defined by data exchanges. Hence, the efficient distribution, storage, and management of data is expected to play an increasingly vital role in human society.

The quantity of data that must be managed, in the form of computer programs, databases, files, and the like, increases exponentially. As computer processing power increases, operating system and application software becomes larger. Moreover, the desire to access larger data sets such as data sets comprising multimedia files and large databases further increases the quantity of data that is managed. This increasingly large data load must be transported between computing devices and stored in an accessible fashion. The exponential growth rate of data is expected to outpace improvements in communication bandwidth and storage capacity, making the need to handle data management tasks using conventional methods even more urgent.

Data comes in many varieties and flavors. Characteristics of data include, for example, the frequency of read access, frequency of write access, size of each access request, permissible latency, permissible availability, desired reliability, security, and the like. Some data is accessed frequently, yet rarely changed. Other data is frequently changed and requires low latency access. These characteristics should affect the manner in which data is stored.

Many factors must be balanced and often compromised in the operation of conventional data storage systems. Because the quantity of data stored is large and rapidly increasing, there is continuing pressure to reduce cost per bit of storage. Also, data management systems should be sufficiently scaleable to contemplate not only current needs, but future needs as well. Preferably, storage systems are designed to be incrementally scaleable so that a user can purchase only the capacity needed at any particular time. High reliability and high availability are also considered as data users become increasingly intolerant of lost, damaged, and unavailable data. Unfortunately, conventional data management architectures must compromise these factors—no single data architecture provides a cost-effective, highly reliable, highly available, and dynamically scaleable solution. Conventional RAID (redundant array of independent disks) systems provide a way to store the same data in different places (thus, redundantly) on multiple storage devices such as hard disks. By placing data on multiple disks, input/output (I/O) operations can overlap in a balanced way, improving performance. Since using multiple disks increases the mean time between failure (MTBF) for the system as a whole, storing data redundantly also increases fault-tolerance. A RAID system relies on a hardware or software controller to hide the complexities of the actual data management so that a RAID systems appear to an operating system to be a single logical hard disk. However, RAID systems are difficult to scale because of physical limitations on the cabling and controllers. Also, RAID systems are highly dependent on the controllers so that when a controller fails, the data stored behind the controller becomes unavailable. Moreover, RAID systems require specialized, rather than commodity hardware, and so tend to be expensive solutions.

RAID solutions are also relatively expensive to maintain. RAID systems are designed to enable recreation of data on a failed disk or controller but the failed disk must be replaced to restore high availability and high reliability functionality. Until replacement occurs, the system is vulnerable to additional device failures. Condition of the system hardware must be continually monitored and maintenance performed as needed to maintain functionality. Hence, RAID systems must be physically situated so that they are accessible to trained technicians who can perform the maintenance. This limitation makes it difficult to set up a RAID system at a remote location or in a foreign country where suitable technicians would have to be found and/or transported to the RAID equipment to perform maintenance functions.

NAS (network-attached storage) refers to hard disk storage that is set up with its own network address rather than being attached to an application server. File requests are mapped to the NAS file server. NAS may perform I/O operations using RAID internally (i.e., within a NAS node). NAS may also automate mirroring of data to one or more other NAS devices to further improve fault tolerance. Because NAS devices can be added to a network, they may enable some scaling of the capacity of the storage systems by adding additional NAS nodes. However, NAS devices are constrained in RAID applications to the abilities of conventional RAID controllers. NAS systems do not generally enable mirroring and parity across nodes, and so a single point of failure at a typical NAS node makes all of the data stored at that NAS node unavailable.

The inherent limitations of RAID and NAS storage make it difficult to strategically locate data storage mechanisms. Data storage devices exist in a geographic, political, economic and network topological context. Each of these contexts affects the availability, reliability, security, and many other characteristics of stored data.

The geographic location of any particular data storage device affects the cost of installation, operation and maintenance. Moreover, geographic location affects how quickly and efficiently the storage device can be deployed, maintained, and upgraded. Geographic location also affects, for example, the propensity of natural disasters such as earthquakes, hurricanes, tornadoes, and the like that may affect the availability and reliability of stored data.

Political and economic contexts relate to the underlying socioeconomic and political constraints that society places on data. The cost to implement network data storage varies significantly across the globe. Inexpensive yet skilled labor is available in some locations to set up and maintain storage. Network access is expensive in some locations. Tax structures may tax data storage and/or transport on differing bases that affect the cost of storage at a particular location. Governments apply dramatically different standards and policies with respect to data. For example, one jurisdiction may allow unrestricted data storage representing any type of program or user data. Other jurisdictions may restrict certain types of data (e.g., disallow encrypted data or political criticism).

The network topological context of stored data refers to the location of the data storage device with respect to other devices on a network. In general, latency (i.e., the amount of time it takes to access a storage device) is affected by topological closeness between the device requesting storage and the storage device itself. The network topological context may also affect which devices can access a storage device, because mechanisms such as firewalls may block access based on network topological criteria.

The strategic location of data storage refers to the process of determining a location or locations for data storage that provide a specified degree of availability, reliability, and security based upon the relevant contexts associated with the data storage facilities. Current data storage management capabilities do not allow a data user to automatically select or change the location or locations at which data is stored. Instead, a data storage center must be created at or identified within a desired location at great expense in time and money. This requires detailed analysis by the data user of locations that meet the availability, reliability, and security criteria desired—an analysis that is often difficult if not impossible. The data storage center must then be supported and maintained at further expense. A need exists for a data storage management system that enables data users to specify desired performance criteria and that automatically locates data storage capacity that meets these specified criteria.

Philosophically, the way data is conventionally managed is inconsistent with the hardware devices and infrastructures that have been developed to manipulate and transport data. For example, computers are characteristically general-purpose machines that are readily programmed to perform a virtually unlimited variety of functions. In large part, however, computers are loaded with a fixed, slowly changing set of data that limits their general-purpose nature to make the machines special-purpose. Advances in processing speed, peripheral performance and data storage capacity are most dramatic in commodity computers and computer components. Yet many data storage solutions cannot take advantage of these advances because they are constrained rather than extended by the storage controllers upon which they are based. Similarly, the Internet was developed as a fault tolerant, multi-path interconnection. However, network resources are conventionally implemented in specific network nodes such that failure of the node makes the resource unavailable despite the fault-tolerance of the network to which the node is connected. Continuing needs exist for highly available, highly reliable, and highly scaleable data storage solutions.

SUMMARY OF THE INVENTION

Briefly stated, the present invention involves a data storage system that enables intelligent distribution of data across a plurality of storage devices. The plurality of storage devices forms a "storage substrate" upon which the present invention operates. Each of the storage devices is associated with one or more attributes that characterize the context of the storage device (e.g., capacity, location, connectivity, and the like). Storage tasks are associated with a set of criteria that define desired storage characteristics such as cost, location, security, availability, network connectivity, and the like. Storage devices for a specific storage task are selected by matching the attributes associated with available storage devices to the desired set of criteria.

In a particular implementation, a data storage system is provided that includes a plurality of storage nodes, where each node exists at a physical location having one or more contexts. Interface mechanisms couple to each storage node to communicate storage access requests with the storage node. Data storage management processes select one or more of the storage nodes to serve a data storage request based at least in part upon the particular contexts associated with each of the storage nodes.

DETAILED DESCRIPTION OF THE PREFERRED EMBODIMENTS

The present invention is directed to a globally distributed data storage system and a method for managing and using such a system. The system and method of the present invention endeavor to optimize the storage contained in a diverse collection of network-accessible storage nodes. It optimizes access based on geography, bandwidth, latency, interconnectedness, redundancy, expense, security, reliability and/or other attributes associated with the physical location and/or characteristics of the storage devices. The present invention associates requirements placed on the data with one or more sets of desired criteria, then selects aggregate storage capacity having contexts that together satisfy the criteria. The contexts are represented and communicated by the dynamic exchange of state information between the storage nodes. Preferably, the invention is implemented to enable migration of data fluidly within the network of storage devices to maintain dynamic compliance with the set of desired criteria.

The present invention is illustrated and described in terms of a distributed computing environment such as an enterprise computing system using public communication channels such as the Internet. However, an important feature of the present invention is that it is readily scaled upwardly and downwardly to meet the needs of a particular application. Accordingly, unless specified to the contrary, the present invention is applicable to significantly larger, more complex network environments as well as small network environments such as conventional LAN systems.

Figure 1:
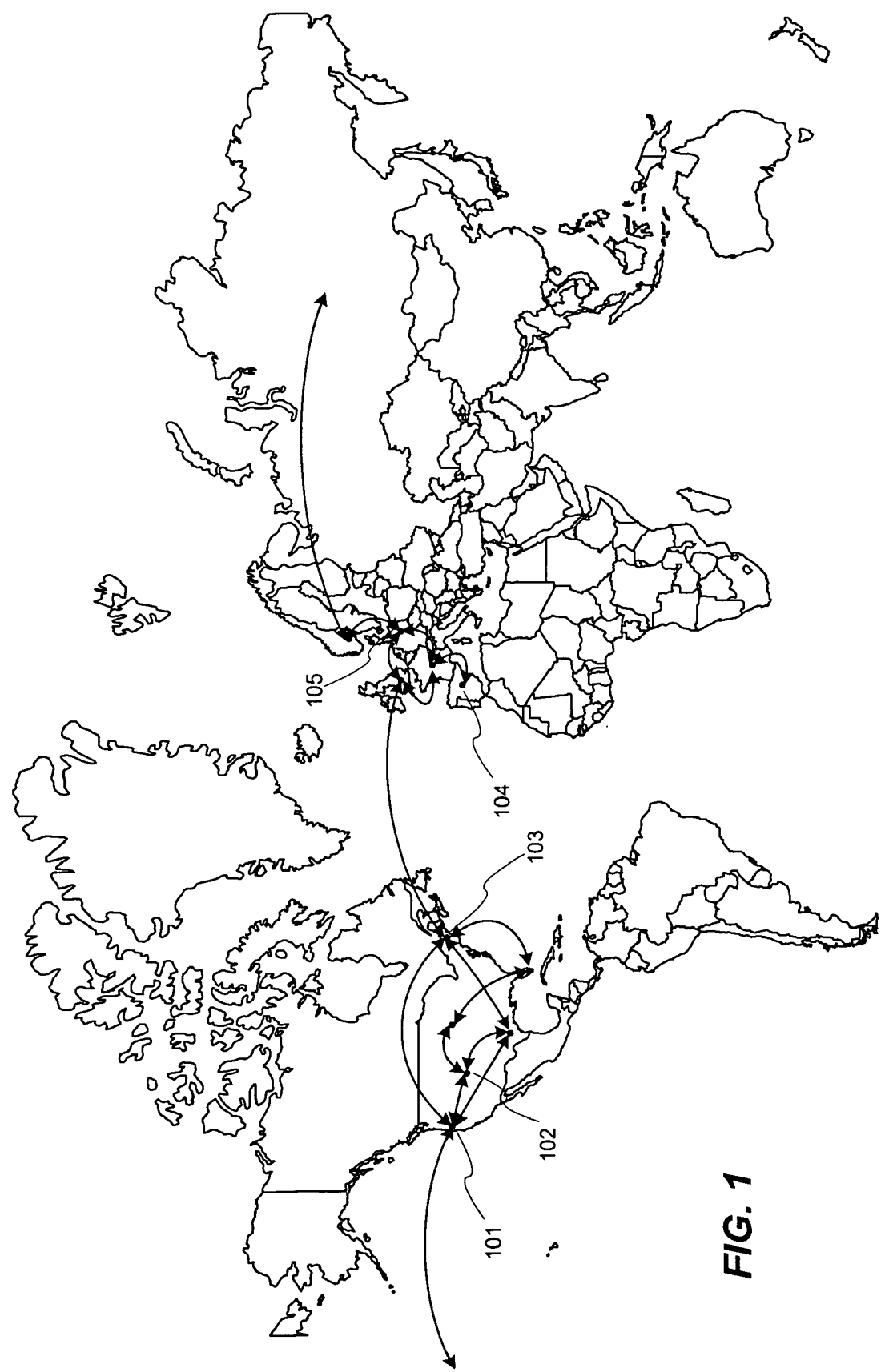
FIG. 1 illustrates a globally distributed storage network in accordance with an embodiment of the present invention.

In the example of FIG. 1, sites 101-105 are globally distributed storage nodes, each implementing a quantity of network accessible mass storage. Each site 101-105 implements one or more than one storage node where each storage node is identified by an independent network address and so is network accessible. Site 101 provides highly connected, high speed, but relatively high cost storage. Site 101 is readily maintained and highly available, but may be too expensive to house seldom used, replicated, or backup data. Site 102 represents a high capacity, low cost storage facility. Site 103 illustrates a highly secure, relatively expensive storage facility located on the east cost of the United States. All of sites 101-103 are subject to jurisdiction of the United State, and each is individually subject to the jurisdiction of the various states, counties, cities or other municipalities in which they are physically located.

Site 104 represents a geographically remote, low cost storage facility. While low cost, the geographic remoteness of site 104 may increase maintenance costs and imply a lower level of network connectivity and availability. Site 105 illustrates a poorly connected storage site located in an alternative jurisdiction that may provide inexpensive overhead costs. Sites 104 and 105 are subject to the laws and customs associated with their physical locations, which are different than those associated with sites 101-103. Free speech customs and laws in the various jurisdictions, for example, may affect the types of data that can be stored at any given location. Data storage and transport as well as network connectivity may be taxed or otherwise regulated differently between jurisdictions. Even within the United States, as represented by storage nodes 101-103, varying state jurisdictions may subject the data owner and/or data user to varying state court jurisdictions and their associated regulatory requirements.

The present invention enables a mechanism to strategically select the storage location or locations suitable for a specific task based on the varying characteristics associated with these locations. For example, a primary image of a frequently accessed data volume is suitable for site 101. Site 102 may be more appropriate for personal computer backup data—where access is less frequent, but volume is large due to a large number of users. Site 103 may be appropriate for financial records or medical data where highly secure storage is required. Because of the lower cost associated with site 104, it may be appropriate for storing backup or replicated data images of data stored on sites 101-103, for example. Site 105 may be appropriate for storing seldom used archival records. All of these examples are illustrative only, as it is contemplated that every data storage need will have its own set of desired performance characteristics that will be satisfied by one, and often more than one data storage location.

Figure 2:
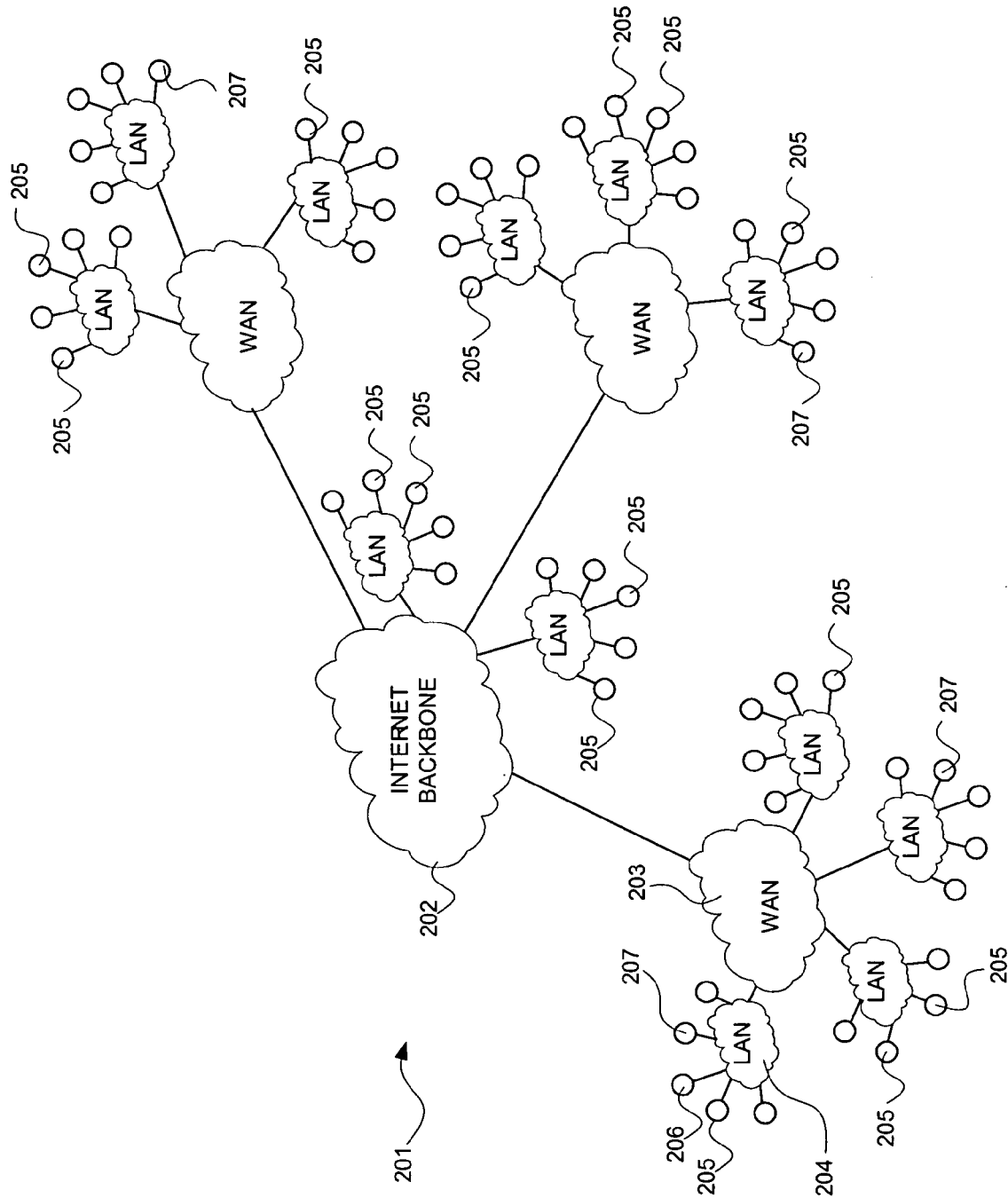
FIG. 2 shows a networked computer environment in which the present invention is implemented.

The present invention is directed to data storage on a network 201 shown in FIG. 2. FIG. 2 shows an exemplary internetwork environment 201 such as the Internet. The Internet is a global internetwork formed by logical and physical connection between multiple Wide Area Networks (WANs) 203 and Local Area Networks (LANs) 204. An Internet backbone 202 represents the main lines and routers that carry the bulk of the traffic. The backbone is formed by the largest networks in the system that are operated by major Internet service providers (ISPs) such as GTE, MCI, Sprint, UUNet, and America Online, for example. While single connection lines are used to conveniently illustrate WAN 203 and LAN 204 connections to the Internet backbone 202, it should be understood that in reality multi-path, routable wired or wireless connections exist between multiple WANs 203 and LANs 204. This makes an internetwork 201 such as the Internet robust when faced with single or multiple failure points.

It is important to distinguish network connections from internal data pathways implemented between peripheral devices within a computer. A "network" comprises a system of general purpose, usually switched, physical connections that enable logical connections between processes operating on nodes 105. The physical connections implemented by a network are typically independent of the logical connections that are established between processes using the network. In this manner, a heterogeneous set of processes ranging from file transfer, mail transfer, and the like can use the same physical network. Conversely, the network can be formed from a heterogeneous set of physical network technologies that are invisible to the logically connected processes using the network. Because the logical connection between processes implemented by a network is independent of the physical connection, internetworks are readily scaled to a virtually unlimited number of nodes over long distances.

In contrast, internal data pathways such as a system bus, Peripheral Component Interconnect (PCI) bus, Intelligent Drive Electronics (IDE) bus, Small Computer System Interface (SCSI) bus, Fibre Channel, and the like define physical connections that implement special-purpose connections within a computer system. These connections implement physical connections between physical devices as opposed to logical connections between processes. These physical connections are characterized by limited distance between components, limited number of devices that can be coupled to the connection, and constrained format of devices that can be connected over the connection.

To generalize the above discussion, the term "network" as it is used herein refers to a means enabling a physical and logical connection between devices that 1) enables at least some of the devices to communicate with external sources, and 2) enables the devices to communicate with each other. It is contemplated that some of the internal data pathways described above could be modified to implement the peer-to-peer style communication of the present invention, however, such functionality is not currently available in commodity components. Moreover, such modification, while useful, would fail to realize the full potential of the present invention as storage nodes implemented across, for example, a SCSI bus would inherently lack the level of physical and topological diversity that can be achieved with the present invention.

Referring again to FIG. 1, the present invention is implemented by placing storage devices at nodes 105. The storage at any node 105 may comprise a single hard drive, may comprise a managed storage system such as a conventional RAID device having multiple hard drives configured as a single logical volume, or may comprise any reasonable hardware configuration in-between. Significantly, the present invention manages redundancy operations across nodes, as opposed to within nodes, so that the specific configuration of the storage within any given node can be varied significantly without departing from the present invention.

Optionally, one or more nodes such as nodes 106 implement storage allocation management (SAM) processes that manage data storage across multiple nodes 105 in a distributed, collaborative fashion. SAM processes may be implemented in a centralized fashion within special-purpose nodes 106. Alternatively, SAM processes are implemented within some or all of RAIN nodes 105. The SAM processes communicate with each other and handle access to the actual storage devices within any particular RAIN node 105. The capabilities, distribution, and connections provided by the RAIN nodes in accordance with the present invention enable storage processes (e.g., SAM processes) to operate with little or no centralized control for the system as whole.

Figure 5:
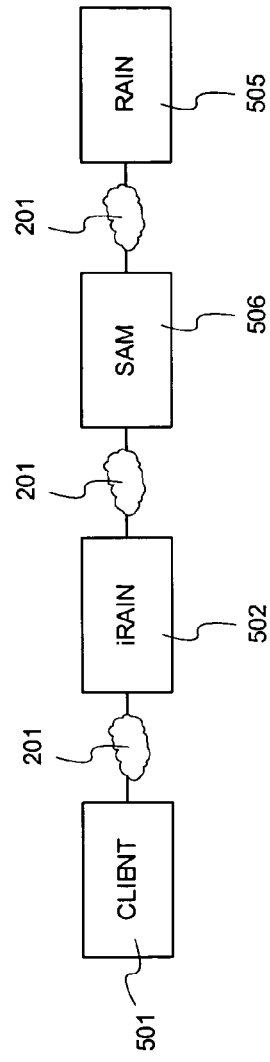
FIG. 5 and FIG. 6 show exemplary organizations of the RAIN elements into a redundant array storage system.

One or more nodes such as nodes 207 implement intelligent management processes in accordance with the present invention—indicated as iRAIN processes 502 in FIG. 5—that communicate with SAM processes 506 to orchestrate data storage. The iRAIN processes may be implemented in a centralized fashion within special-purpose nodes 207. Alternatively, iRAIN processes may be implemented within some or all of RAIN nodes 205/206. The iRAIN processes communicate with SAM processes 206 to access state information about the individual contexts associated with the collection of RAIN storage nodes 505.

The network of storage nodes that in cooperation with SAM processes orchestrate read and write tasks amongst the nodes, together form what is referred to herein as a "storage substrate". The intelligent management processes of the present invention operate to direct and constrain the operations of the storage substrate so as to satisfy desired criteria specified for a particular storage task. Like the SAM processes discussed above, the intelligent management processes may be implemented in a centralized fashion in a single storage node or in a small number of storage nodes 205. Alternatively, these intelligent management processes may be implemented in all storage nodes 205.

Figure 3:
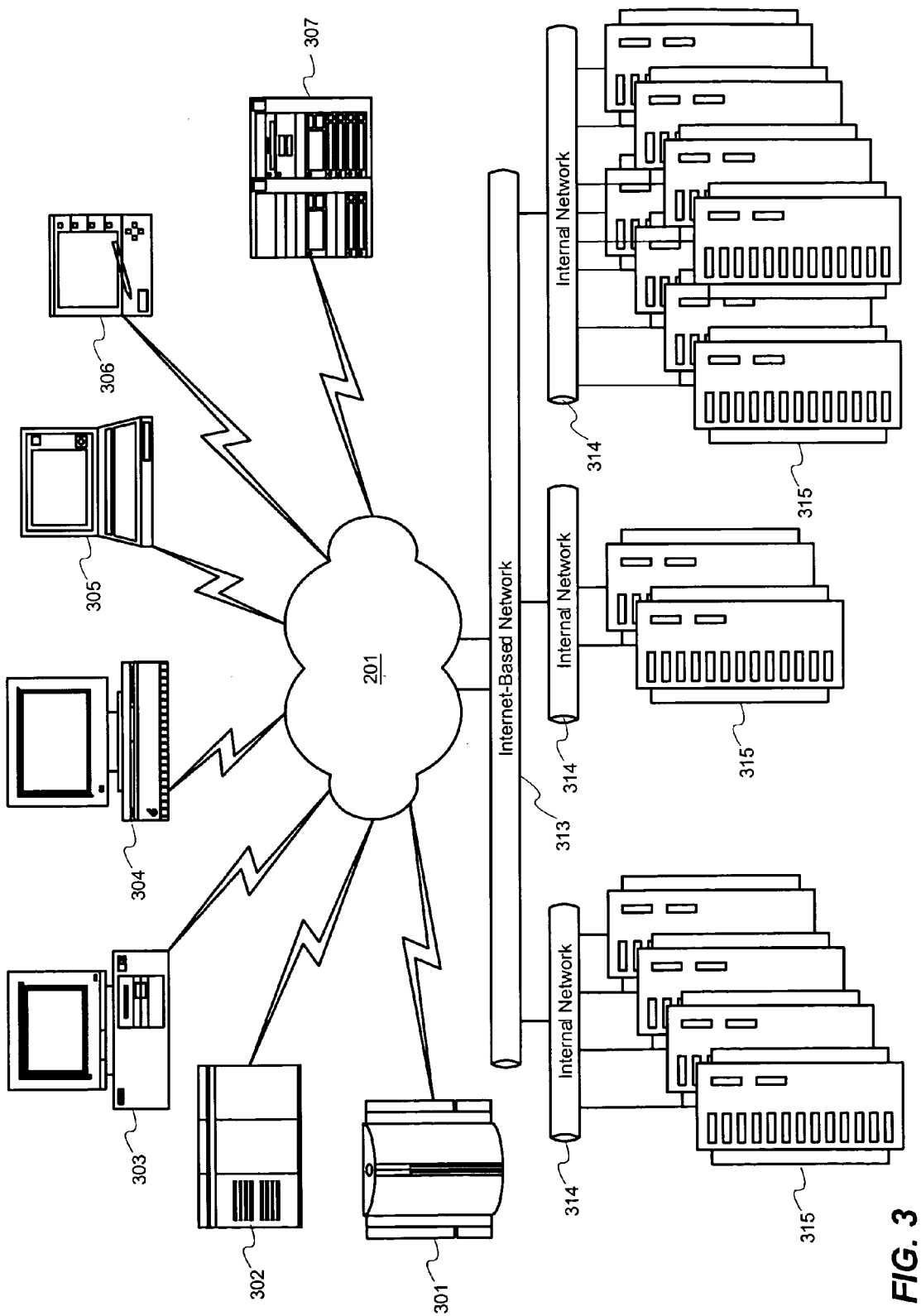
FIG. 3 shows a computing environment in which the present invention is implemented at a different level of detail.

FIG. 3 shows an alternate view of an exemplary network computing environment in which the present invention is implemented. Internetwork 201 enables the interconnection of a heterogeneous set of computing devices and mechanisms ranging from a supercomputer or data center 301 to a handheld or pen-based device 306. While such devices have disparate data storage needs, they share an ability to access data via network 201 and operate on that data with their own resources. Disparate computing devices including mainframe computers (e.g., VAX station 302 and IBM AS/400 station 308) as well as personal computer or workstation class devices such as IBM compatible device 303, Apple Macintosh device 304 and laptop computer 305 are readily interconnected via internetwork 201.

Internet-based network 313 comprises a set of logical connections, some of which are made through internetwork 201, between a plurality of internal networks 314. Conceptually, Internet-based network 313 is akin to a WAN 203 in that it enables logical connections between spatially distant nodes. Internet-based networks 313 may be implemented using the Internet or other public and private WAN technologies including leased lines, Fibre Channel, and the like.

Similarly, internal networks 214 are conceptually akin to LANs 104 shown in FIG. 1 in that they enable logical connections across more limited distances than those allowed by a WAN 103. Internal networks 214 may be implemented using LAN technologies including Ethernet, Fiber Distributed Data Interface (FDDI), Token Ring, Appletalk, Fibre Channel, and the like.

Each internal network 214 connects one or more RAIN elements 215 to implement RAIN nodes 105. Each RAIN element 215 comprises a processor, memory, and one or more mass storage devices such as hard disks. RAIN elements 215 also include hard disk controllers that may be conventional EIDE or SCSI controllers, or may be managing controllers such as RAID controllers. RAIN elements 215 may be physically dispersed or co-located in one or more racks sharing resources such as cooling and power. Each node 105 is independent of other nodes 105 in that failure or unavailability of one node 105 does not affect availability of other nodes 105, and data stored on one node 105 may be reconstructed from data stored on other nodes 105.

The perspective provided by FIG. 2 is highly physical and it should be kept in mind that physical implementation of the present invention may take a variety of forms. The multi-tiered network structure of FIG. 2 may be altered to a single tier in which all RAIN nodes 105 communicate directly with the Internet. Alternatively, three or more network tiers may be present with RAIN nodes 105 clustered behind any given tier. A significant feature of the present invention is that it is readily adaptable to these heterogeneous implementations.

The specific implementation discussed above is readily modified to meet the needs of a particular application. Because the present invention uses network methods to communicate with the storage nodes, the particular implementation of a storage node is largely hidden from the devices accessing the storage nodes, making the present invention uniquely receptive to modifications in node configuration. For example, processor type, speed, instruction set architecture, and the like can be modified easily and may vary from node to node. The hard disk capacity and configuration within RAIN elements 315 can be readily increased or decreased to meet the needs of a particular application. Although mass storage is implemented using magnetic hard disks, other types of mass storage devices such as magneto-optical, optical disk, digital optical tape, holographic storage, atomic force probe storage and the like can be used interchangeably as they become increasingly available. Memory configurations including but not limited to RAM capacity, RAM speed, and RAM type (e.g., DRAM, SRAM, SDRAM) can vary from node to node making the present invention incrementally upgradeable to take advantage of new technologies and component pricing. Network interface components may be provided in the form of expansion cards coupled to a mother board 405 or built into a motherboard 405 and may operate with a variety of available interface speeds (e.g., 10 BaseT Ethernet, 100 BaseT Ethernet, Gigabit Ethernet, 56K analog modem) as well as provide varying levels of buffering and the like.

Figure 4:
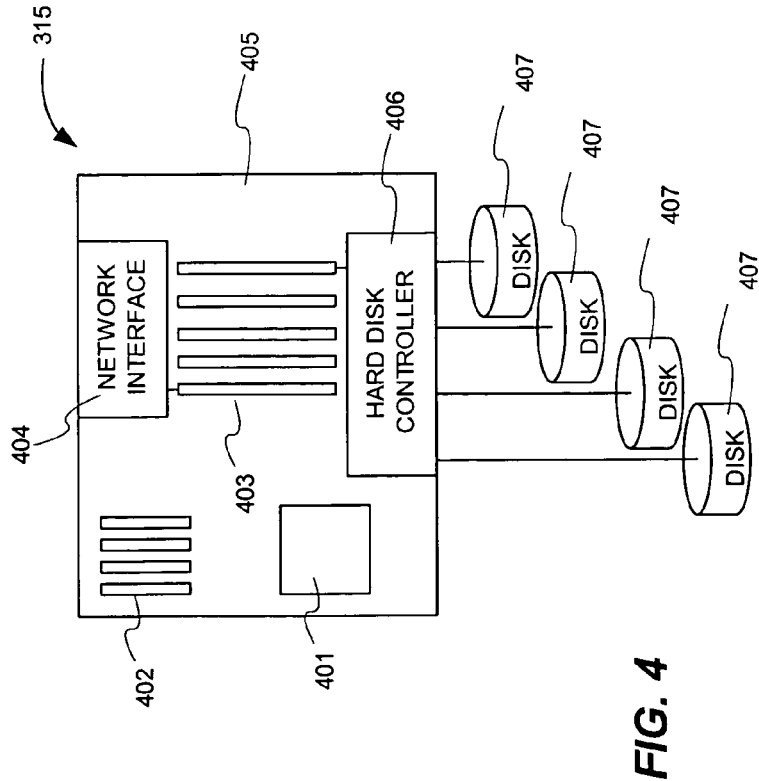
FIG. 4 illustrates components of a RAIN element in accordance with an embodiment of the present invention.

Specifically, it is contemplated that the processing power, memory, network connectivity and other features of the implementation shown in FIG. 4 could be integrated within a disk drive controller and actually integrated within the housing of a disk drive itself. In such a configuration, a RAIN element 315 might be deployed simply by connecting such an integrated device to an available network, and multiple RAIN elements 315 might be housed in a single physical enclosure.

Each RAIN element 315 may execute an operating system. The particular implementations use a UNIX operating system (OS) or UNIX-variant OS such as Linux. It is contemplated, however, that other operating systems including DOS, Microsoft Windows, Apple Macintosh OS, OS/2, Microsoft Windows NT and the like may be equivalently substituted with predictable changes in performance. Moreover, special purpose lightweight operating systems or micro kernels may also be used, although cost of development of such operating systems may be prohibitive. The operating system chosen implements a platform for executing application software and processes, mechanisms for accessing a network, and mechanisms for accessing mass storage. Optionally, the OS supports a storage allocation system for the mass storage via the hard disk controller(s).

In the particular embodiment there is no centralized storage controller required within a node 205 nor is a centralized storage controller required for a group of nodes 205 connected via an internal network 314. This ensures that each node 205 (i.e., each RAIN element 315) operates independently. Conceptually, storage management is provided across an arbitrary set of nodes 205 that may be coupled to separate, independent internal networks 315 via internetwork 313. This increases availability and reliability in that one or more internal networks 314 can fail or become unavailable due to congestion or other events without affecting the availability of data.

Various application software and processes can be implemented on each RAIN element 315 to provide network connectivity via a network interface 404 using appropriate network protocols such as User Datagram Protocol (UDP), Transmission Control Protocol (TCP), Internet Protocol (IP), Token Ring, Asynchronous Transfer Mode (ATM), and the like.

In the particular embodiments, the data stored in any particular node 205 can be recovered using data at one or more other nodes 205 using data recovery and storage management processes. These data recovery and storage management processes preferably execute on a node 206 and/or on one of the nodes 205 separate from the particular node 205 upon which the data is stored. Conceptually, storage management capabilities are provided across an arbitrary set of nodes 205 that may be coupled to separate, independent internal networks 315 via internetwork 313. This increases availability and reliability in that one or more internal networks 314 can fail or become unavailable—due to congestion, changes in network topology, or other events—without affecting the availability of data.

In an elemental form, each RAIN element 315 has some superficial similarity to a network attached storage (NAS) device. However, because the RAIN elements 315 work cooperatively, the functionality of a RAIN system comprising multiple cooperating RAIN elements 315 is significantly greater than a conventional NAS device. Further, each RAIN element preferably supports data structures that enable read, write, and parity operations across nodes 205 (as opposed to within nodes 205). These data structures enable operations akin to RAID operations because RAIN operations are distributed across nodes and the nodes are logically, but not necessarily physically connected. For this reason, RAIN read, write, and parity operations are significantly more fault tolerant, reliable, and efficient than those operations as enabled by conventional RAID systems.

FIG. 5 shows a conceptual diagram of the relationship between the intelligent storage management processes in accordance with the present invention, labeled "iRAIN" processes 502 in FIG. 5, with the underlying storage substrate implemented by SAM processes 506 on storage nodes 505. It should be understood that RAIN nodes 505, SAM processes 506, and iRAIN processes 502 are preferably distributed processes that perform system operations in parallel. In other words, the physical machines that implement these processes may comprise tens, hundreds, or thousands of machines that communicate with each other via network(s) 201 in a highly parallellized manner to perform storage tasks.

A collection of RAIN storage elements 505 provides basic persistent data storage functions by accepting read/write commands from external sources. Additionally, RAIN storage elements communicate with each other to exchange state information that describes, for example, the particular context of each RAIN element 315 within the collection 505.

A collection of SAM processes 506 provides basic storage management functions using the collection of RAIN storage nodes 505. The collection of SAM processes 506 is implemented in a distributed fashion across multiple nodes 205/206. SAM processes 506 receive storage access requests, and generate corresponding read/write commands to members of the RAIN node collection 505. SAM processes are, in the particular implementations, akin to RAID processes in that they select particular RAIN nodes 315 to provide a desired level of availability, reliability, redundancy, and security using a variety of parity storage schemes. SAM processes 506 provide a first level of data management, but in general do not select particular storage nodes 315 for a particular task based on context information.

The iRAIN processes 502, however, compare desired criteria associated with a storage task with state information describing the context of particular RAIN nodes 315 within a collection 505 to direct and constrain the SAM processes 506. The collection of iRAIN processes 502 is implemented in a distributed fashion across multiple nodes 205/206/207. The iRAIN processes 502 are coupled to receive storage tasks from clients 501. Storage tasks may involve storage allocation, deallocation, and migration, as well as read/write/parity operations. Storage tasks are associated with a specification of desired criteria that the storage task should satisfy. For example, a storage task may be associated with one or more criteria such as cost, availability, jurisdictional, or security criteria. In operation, iRAIN processes 501 direct and constrain the operations of the storage substrate to satisfy the desired criteria specified by a particular storage task.

Figure 6:
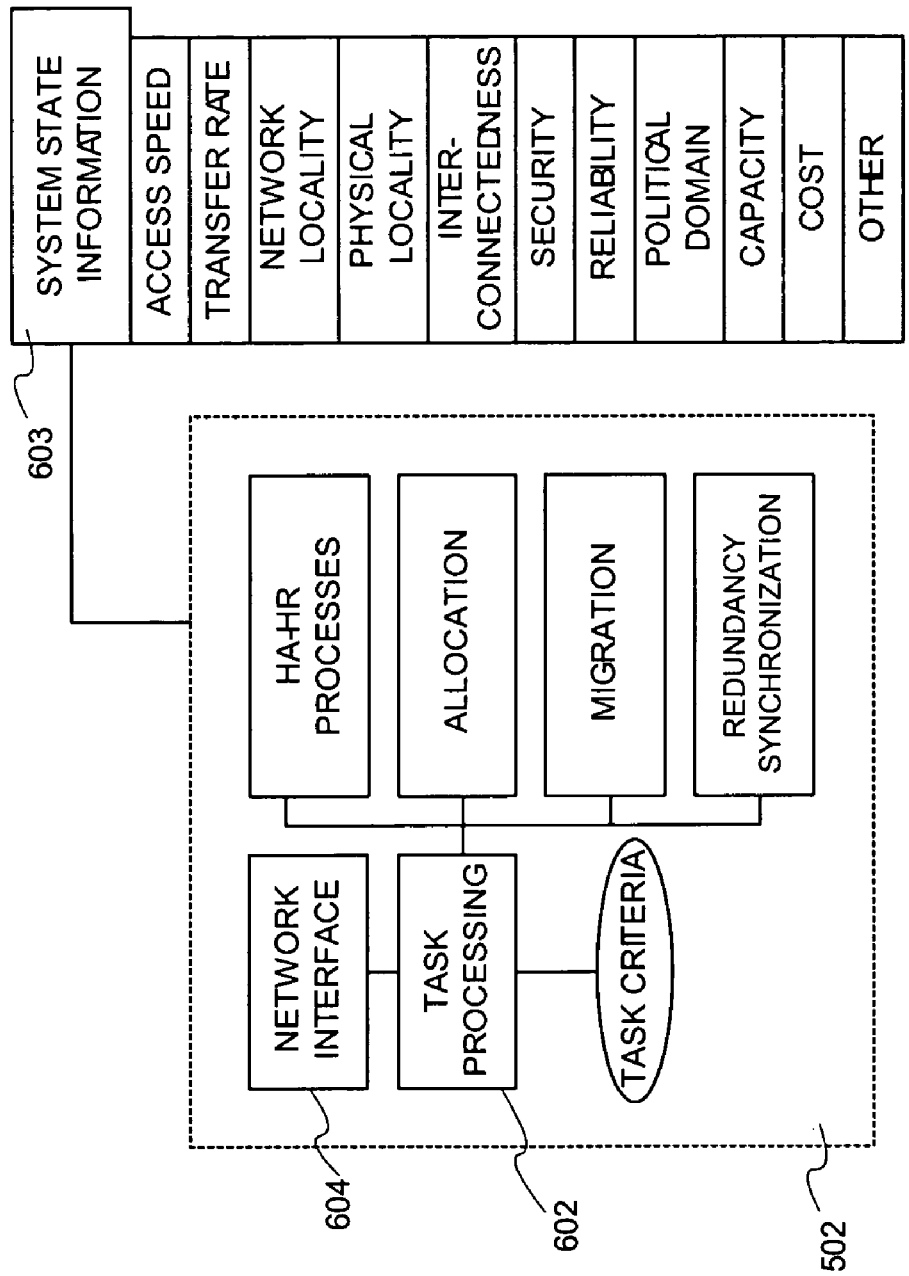

FIG. 6 illustrates an exemplary set of intelligent management processes 501. These intelligent management processes include processing requests for storage access, identification and allocation or deallocation of storage capacity, migration of data between storage nodes 205, redundancy synchronization between redundant data copies, and the like. Other processes include monitoring the political, economic, and topological contexts of each storage node 205, generating storage tasks that reflect these changing contexts, and the like. The iRAIN processes 502 preferably abstract or hide the underlying configuration, location, cost, and other context information associated with each RAIN node 205 from data users. The iRAIN processes 501 also enable a degree of fault tolerance that is greater than any storage node in isolation as parity is spread out across multiple storage nodes that are geographically, politically and topologically dispersed depending on the desired criteria.

As shown in FIG. 6, an interface or protocol 604 is used for requesting services or servicing requests from clients 501, and for exchanging requests between iRAIN processes 501, SAM processes 506, and storage nodes 505. This protocol can be used between processes executing on a single node, but is more commonly used between nodes distributed across a network, typically the Internet. Storage access requests indicate, for example, the type and size of data to be stored, characteristic frequency of read and write access, constraints of physical or topological locality, cost constraints, and similar data that indicate desired data storage criteria.

The iRAIN processes associate the desired criteria with a storage request or a storage task as discussed hereinbefore. The iRAIN processes 502 generate storage requests to SAM processes 506 and/or storage nodes 505 to implement the actual storage tasks. In generating these storage requests, iRAIN processes 502 use the desired criteria to select which storage nodes exist in contexts that satisfy the desired criteria. The current context of the storage nodes is represented by state information held in the state information data structure 503.

The connection between a storage task and the desired criteria associated with that task is preferably persistent in that the desired criteria remain associated with the data for the lifetime of the data stored. This persistence enables the iRAIN processes 502 to periodically, continuously, or intermittently check to ensure that a storage task's desired criteria are being satisfied by the current context of the nodes in which the data is stored. It is contemplated that over time the desired criteria for a particular task may change, or the contexts of the various storage nodes will change, or both. Such changes can be detected by the iRAIN processes 502 by comparing the desired criteria associated with data to the current state information.

When changes result in a set of data stored in a manner that is no longer consistent with the desired criteria associated with it, the iRAIN process can generate storage requests (e.g., read/write operations) to SAM processes 506 and/or RAIN nodes 505 that effect migration of data to storage devices having contexts that satisfy the desired criteria. Changes can be detected reactively, as described above, or proactively by including anticipatory state information in the state information data structure. For example, an impending hurricane may reduce the reliability and availability contexts associated with storage nodes in the hurricane's path. IRAIN processes 501, when informed of changes in this state information, can proactively move data from storage nodes in the hurricane's path before the event actually affects availability.

SAM processes 506 also include processes to implement high availability, high reliability data storage such as that implemented by conventional RAID systems. In one embodiment, the system in accordance with the present invention defines multiple levels of RAID-like fault tolerant performance across nodes in addition to fault tolerant functionality within nodes. The HA/HR processes also include methods to recreate data in the event of component failure and to redirect requests for data access to available storage nodes 105 in the event of failure, congestion, or other events that limit data availability. Redundancy synchronization processes manage storage capacity that is configured having mirrored or parity copies to ensure that all read and write operations are mirrored to all copies and/or parity data is computed, stored, and/or checked and verified in conjunction with read/write accesses.

Allocation processes include processes for aggregation of node storage to present a single collective storage resource, and allocation of the aggregated storage to match performance criteria specified in the request for data storage access. Storage capacity in each storage node is characterized by such attributes as access speed, transfer rate, network locality (i.e., network topological context), physical locality, interconnectedness, security, reliability, political domain, cost, or other attributes that are useful in discriminating the geographic, political, jurisdictional and topological differences between storage nodes 105. Allocation table 502 includes a set of metadata describing these attributes for some or all available RAIN elements 315. SAM allocation processes analyze the desired performance characteristics associated with the data and allocate capacity within a set of RAIN elements 315 that satisfy, or closely satisfy, these specified performance criteria.

In this manner, the intelligent storage management solution in accordance with the present invention enables the specifics of a data storage task to be separated from a wide variety of data access concerns. The present invention enables the dynamic configuration and selection of where data is stored, how fault tolerantly it is stored, the dynamic adjustment of the housing of data to minimize costs, and maximizing the availability of the data. The present invention also enables the movement of data closer to its users or consumers and automatic adaptation to networking conditions or new network topologies. Moreover, the present invention provides a system and methods that enable data migration that remains compliant with changing jurisdictional, political and social requirements.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A data storage system comprising:
a plurality of storage nodes, each node existing at a physical location and each storage node having associated contexts that define characteristics of each storage node, wherein first contexts including a political context, an economic context, and a geographic context are related to at least the physical location of each storage node and wherein second contexts including a network topological context are related to at least attributes of each storage node;
interface mechanisms coupled to each storage node for communicating data storage requests with the storage node, at least one data storage access request including performance criteria that define storage characteristics that are desired for data associated with the data storage access requests; and
data storage management processes that select one or more of the storage nodes to serve the at least one data storage access request based at least in part upon the first contexts and the second contexts that satisfy the performance criteria, wherein the first contexts and the second contexts are used to discriminate differences between the plurality of storage nodes and identify the selected one or more storage nodes to serve the at least one data storage access request.

2. The system of claim 1 wherein the data storage management processes comprise computer-implemented processes executing in at least one of the storage nodes.

3. The system of claim 1 wherein the data storage management processes comprise computer-implemented processes executing in all of the storage nodes.

4. The system of claim 1 wherein the performance criteria identify storage characteristics including one or more of cost, location, security, availability, or network connectivity.

5. The system of claim 1 wherein the data storage management processes comprise processes for matching the performance criteria to the first and second contexts of the storage nodes.

6. The data storage system of claim 1 wherein the data storage management processes present a unitary logical volume of data storage to external devices generating the storage access requests to the selected one or more storage nodes.

7. The data storage system of claim 6 wherein the selected one or more storage nodes are selected such that the first and second contexts of the selected one or more storage nodes that are associated with the unitary logical volume satisfy the performance criteria associated with the storage access requests.

8. The data storage system of claim 1 further comprising encryption mechanisms coupled to the interface mechanisms for encrypting storage access requests during communication between nodes.

9. The data storage system of claim 1 further comprising authentication mechanisms coupled to the interface mechanisms for authenticating storage nodes before communicating storage requests.

10. A method of managing distributed data storage comprising the acts of:
providing a plurality of distributed storage nodes, each node existing at a physical location and each node having one or more associated contexts that relate to storage characteristics of each node, the contexts including first contexts including a political context, an economic context, and a geographic context that are associated to at least the physical location and second contexts including a network topological context that are associated with attributes of the storage node;
receiving a data storage task in one of the storage nodes;
determining desired criteria associated with the received data storage task, wherein the desired criteria define storage characteristics for the data storage task;
selecting one or more of the plurality of storage nodes by matching the desired criteria to the associated first and second contexts, wherein the selected one or more of the plurality of storage nodes have first and second contexts that satisfy the desired criteria; and
executing the storage task in the one or more selected storage nodes.

11. The method of claim 10 wherein the selected storage nodes comprise at least two storage nodes where neither of the at least two storage nodes individually satisfy the desired criteria, but collectively the at least two storage nodes satisfy the desired-criteria.

12. The method of claim 10 wherein the selected storage nodes comprise at least two storage nodes and the at least two storage nodes are located in different geographical locations.

13. The method of claim 10 wherein the selected storage nodes comprise at least two storage nodes and the at least two storage nodes are located in different areas of a single data center.

14. The method of claim 10 wherein the selected storage nodes comprise at least two storage nodes and the at least two storage nodes are connected via different network backbones in a single data center.

15. The method of claim 10 wherein the selected storage nodes comprise at least two storage nodes and the at least two storage nodes are located in different data centers.

16. The method of claim 10 wherein the selected storage nodes comprise at least two storage nodes and the at least two storage nodes are located in different cities.

17. The method of claim 10 wherein the selected storage nodes comprise at least two storage nodes and the political context of the at least two storage nodes indicates that the at least two storage nodes are located in different political jurisdictions.

18. The method of claim 10 wherein the selection is based upon the economic context that includes socio-economic attributes of the physical location of the data storage node.

19. The method of claim 10 wherein the act of storing comprises storing the data according to a distributed parity scheme analogous to parity distribution found in RAID subsystems.

20. The method of claim 19 wherein the parity paradigm comprises an N-dimensional parity mechanisms where "N" is greater than three.

21. The method of claim 10 wherein the act of storing comprises storing the data in a manner such that the data stored in any one storage node cannot be used in any meaningful fashion without the availability of some or all of the data stored in other storage nodes.

22. A data storage service comprising:

receiving data storage access requests from a file system, the storage access requests including performance criteria that defines storage requirements for data associated with the storage access requests;

maintaining a state information data structure including state information describing the contexts of a number of network-accessible storage devices, wherein first contexts include a political context, an economic context, and a geographic context that are related to a physical location of the network-accessible storage devices and second contexts include a network topological context that is related to attributes of the network-accessible storage devices and wherein the first and second contexts are used to discriminate between storage characteristics of the number of network-accessible storage devices; and using the first and second contexts from the state information to allocate capacity within the network-accessible storage devices to handle the received data storage request by using network-accessible storage devices having contexts that satisfy the performance criteria.

23. The data storage service of claim 22 wherein the act of maintaining the state information data structure comprises:

detecting a change in state information associated with at least one of the network-accessible storage devices; and updating the state information associated with the at least one network-accessible storage device to include the change in state information.

24. The data storage service of claim 22 further comprising:

dynamically re-allocating capacity within the network-accessible storage devices in response to detecting a change in their associated contexts.

25. The data storage service of claim 24 wherein the dynamic re-allocating is done in the absence of an externally generated data storage access request.

* * * * *

UNITED STATES PATENT AND TRADEMARK OFFICE
CERTIFICATE OF CORRECTION

PATENT NO.         : 7,509,420 B2
APPLICATION NO. : 09/777002
DATED                  : March 24, 2009
INVENTOR(S)        : Moulton et al.

It is certified that error appears in the above-identified patent and that said Letters Patent is hereby corrected as shown below:

Title Page

Item should read

(60)   Provisional application No. 60/245,920, filed on Nov. 06, 2000, and provisional application No. 60/183,762, filed on Feb. 18, 2000.

Signed and Sealed this

Second Day of June, 2009

JOHN DOLL
*Acting Director of the United States Patent and Trademark Office*